(12) United States Patent
Spiess et al.

(10) Patent No.: US 7,272,729 B2
(45) Date of Patent: Sep. 18, 2007

(54) DATA CARRIER FOR PROCESSING SIGNAL STREAM ACCORDING TO TRANSMISSION PROTOCOLS HAS AN ACTIVE PROCESSING CIRCUIT AND A PASSIVE SIGNAL PROCESSING CIRCUIT WITH POWER SUPPLIES

(75) Inventors: Bernhard Georg Spiess, Graz (AT); Werner Janesch, Voitsberg (AT); Pamir Erdeniz, Graz (AT)

(73) Assignee: NXP B.V., Eindhoven (NL)

( * ) Notice: Subject to any disclaimer, the term of this patent is extended or adjusted under 35 U.S.C. 154(b) by 821 days.

(21) Appl. No.: 10/486,160

(22) PCT Filed: Jul. 31, 2002

(86) PCT No.: PCT/IB02/03205

§ 371 (c)(1),
(2), (4) Date: Feb. 6, 2004

(87) PCT Pub. No.: WO03/015020

PCT Pub. Date: Feb. 20, 2003

(65) Prior Publication Data

US 2004/0257733 A1    Dec. 23, 2004

(30) Foreign Application Priority Data

Aug. 8, 2001   (EP)   ................................. 01890230

(51) Int. Cl.
G06F 1/26    (2006.01)
(52) U.S. Cl. .................. 713/300; 713/324; 340/10.34; 340/10.4

(58) Field of Classification Search ................ 713/300, 713/320, 324; 340/5.1, 10.4, 10.34
See application file for complete search history.

(56) References Cited

U.S. PATENT DOCUMENTS

| | | | | |
|---|---|---|---|---|
| 4,554,508 A | * | 11/1985 | Haque | 455/229 |
| 5,519,386 A | * | 5/1996 | Tobergte | 340/10.34 |
| 6,489,883 B1 | * | 12/2002 | Iiyama et al. | 340/5.1 |
| 6,581,844 B2 | * | 6/2003 | Thueringer et al. | 235/492 |
| 6,980,084 B1 | * | 12/2005 | Yones | 340/10.34 |
| 6,996,726 B1 | * | 2/2006 | Den Besten et al. | 713/300 |
| 7,137,003 B2 | * | 11/2006 | Krishnan et al. | 713/172 |

FOREIGN PATENT DOCUMENTS

EP    0926623 A1 *   6/1999

* cited by examiner

*Primary Examiner*—Chun Cao

(57) ABSTRACT

In a data carrier (1) and in an integrated circuit (5), a first signal processing circuit (8) with a signal-independent power supply is provided for processing a signal stream (SF1) in accordance with a first transmission protocol, and a second signal processing circuit (9) with a signal-dependent power supply is provided for processing a signal stream (SF2) in accordance with a second transmission protocol, which signal stream (SF2) in accordance with the second transmission protocol comprises a signal characteristic, namely a lead signal (VLS), and a detection circuit (25) is provided, which detection circuit is designed for detecting the lead signal (VLS) and ensuring the supplying of the second signal processing circuit (9) with power from a power source (14) provided for the second signal processing circuit (9) following a recognition of the occurrence of the lead signal (VLS).

8 Claims, 2 Drawing Sheets

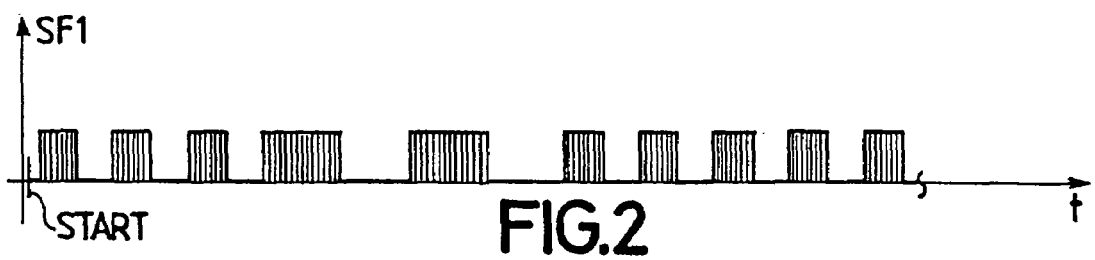
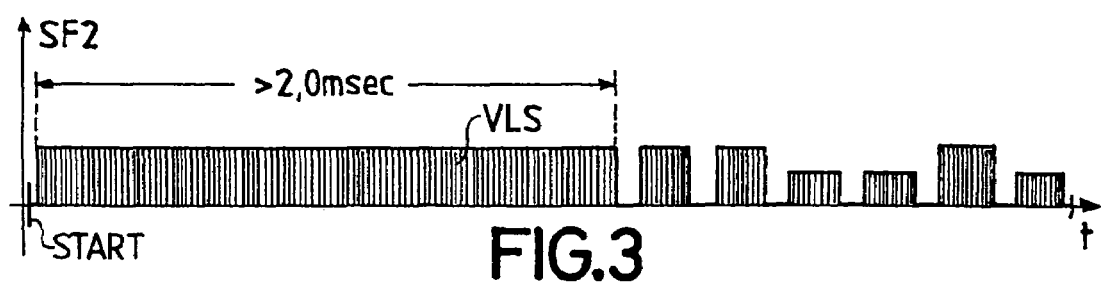

DATA CARRIER FOR PROCESSING SIGNAL STREAM ACCORDING TO TRANSMISSION PROTOCOLS HAS AN ACTIVE PROCESSING CIRCUIT AND A PASSIVE SIGNAL PROCESSING CIRCUIT WITH POWER SUPPLIES

The invention relates to a data carrier with an integrated circuit and to an integrated circuit, wherein a first signal processing circuit with a signal-independent power supply and a second signal processing circuit with a signal-dependent power supply are provided, and wherein the first signal processing circuit is designed to receive and process a signal stream in accordance with a first transmission protocol, and the second signal processing circuit is designed to receive and process a signal stream in accordance with a second transmission protocol, which signal stream in accordance with the second transmission protocol comprises a signal characteristic, and wherein a first power source is provided to supply the first signal processing circuit with power, and wherein a second power source is provided to supply the second signal processing circuit with power.

A data carrier with an integrated circuit and, consequently, an integrated circuit in accordance with the design cited in the first paragraph above, have been put on the market in many embodiment variants, and are therefore known.

Depending on the intended purpose or the operational situation, it is necessary in the case of a data carrier and an integrated circuit of this kind to make an automatic selection of the power supply for the signal processing circuits to be supplied with power, since, for example, in the event that, with the data carrier or the integrated circuit, a signal stream in accordance with the second transmission protocol is received with a sufficiently high amplitude, the power supply for the second signal processing circuit for receiving and processing a signal stream in accordance with the second transmission protocol must be automatically guaranteed, for which reason it is necessary to supply the second signal processing circuit with power automatically from the second power source. In the known solutions, the data carrier is equipped with means for establishing the reception field strength prevailing in the area of the data carrier, wherein, if it is established that a high reception field strength has occurred, giving rise to a high supply voltage in the data carrier, the supplying of the second signal processing circuit from the second power source is taken care of automatically. In practice, this embodiment has proved to give rise to a satisfactory operating result in many cases, but it has also transpired that there are also operational cases in which the known solution cannot be used to achieve a satisfactory operating result.

It is an object of the invention to avoid the above-mentioned, unsatisfactory operational cases, and to create an improved data carrier and an improved integrated circuit.

In order to achieve the above-cited object, a data carrier in accordance with the invention is provided with features in accordance with the invention so that a data carrier in accordance with the invention can be characterized in the manner specified below, namely:

Data carrier with an integrated circuit, wherein a first signal processing circuit with a signal-independent power supply is provided, and wherein a second signal processing circuit with a signal-dependent power supply is provided, and wherein the first signal processing circuit is designed to receive and process a signal stream in accordance with a first transmission protocol, and wherein the second signal processing circuit is designed to receive and process a signal stream in accordance with a second transmission protocol, which signal stream in accordance with the second transmission protocol comprises a signal characteristic, and wherein a first power source is provided to supply the first signal processing circuit with power, and wherein a second power source is provided to supply the second signal processing circuit with power, and wherein detection means are provided, which detection means are designed for detecting the signal characteristic in the signal stream in accordance with the second transmission protocol, and are also designed for initiating the supplying of at least one part of the second signal processing circuit with power from the second power source following a recognition of the occurrence of the signal characteristic.

In order to achieve the above-cited object, an integrated circuit in accordance with the invention is provided with features in accordance with the invention so that an integrated circuit in accordance with the invention can be characterized in the manner specified below, namely:

Integrated circuit wherein a first signal processing circuit with a signal-independent power supply is provided, and wherein a second signal processing circuit with a signal-dependent power supply is provided, and wherein the first signal processing circuit is designed to receive and process a signal stream in accordance with a first transmission protocol, and wherein the second signal processing circuit is designed to receive and process a signal stream in accordance with a second transmission protocol, which signal stream in accordance with the second transmission protocol comprises a signal characteristic, and wherein a first power source is provided to supply the first signal processing circuit with power, and wherein a second power source is provided to supply the second signal processing circuit with power, and wherein detection means are provided, which detection means are designed for detecting the signal characteristic in the signal stream in accordance with the second transmission protocol, and are also designed for initiating the supplying of at least one part of the second signal processing circuit with power from the second power source following recognition of the occurrence of the signal characteristic.

As a result of the provision of the features in accordance with the invention, it is achieved in a simple and, additionally, very operationally reliable manner, that an unambiguous supplying of the second signal processing circuit from the second power source is always guaranteed when this is necessary, the reason being that the supplying in this way of the second signal processing circuit from the second power source is undertaken only following the satisfactory recognition of the signal characteristic contained in a signal stream in accordance with the second transmission protocol, wherein this recognition is completely independent of the reception field strength in the area of a data carrier in accordance with the invention under normal operating conditions.

In a data carrier in accordance with the invention and in an integrated circuit in accordance with the invention, it has proved extremely advantageous if, in addition, the features as claimed in claims 2 and 3 and in claims 5 and 6, respectively, are provided. These embodiments have proved advantageous in respect of an especially unambiguous, reliable recognition of a signal characteristic, wherein, in addition, another advantage that should be mentioned is that, as a result, the recognition of the signal characteristic can also be undertaken in an especially simple manner. It should, however, be mentioned that the signal characteristic may also be formed by a particular bit combination in a signal stream in accordance with the second transmission protocol, which particular bit combination is certain never to occur in a signal stream in accordance with the first transmission protocol.

In a data carrier in accordance with the invention and in an integrated circuit in accordance with the invention, it has further proved particularly advantageous if, in addition, the features as claimed in claim 4 and in claim 8, respectively, are provided. As a result of these measures, it is achieved in an advantageous manner that, with the aid of the two controllable switching means, the data processing means, which form a main power consumer, can be completely separated from the two power sources and, as a result, any unnecessary, undesirable power consumption is prevented.

The above-cited aspects and further aspects of the invention are explained below.

The invention will be further described with reference to examples of embodiments shown in the drawings, to which, however, the invention is not restricted.

FIG. 2 shows a timing diagram of part of a signal stream in accordance with a first transmission protocol, which part occurs at the start of the signal stream.

FIG. 3 shows a timing diagram of part of a signal stream in accordance with a second transmission protocol, which part occurs at the start of the signal stream.

Figure 1:
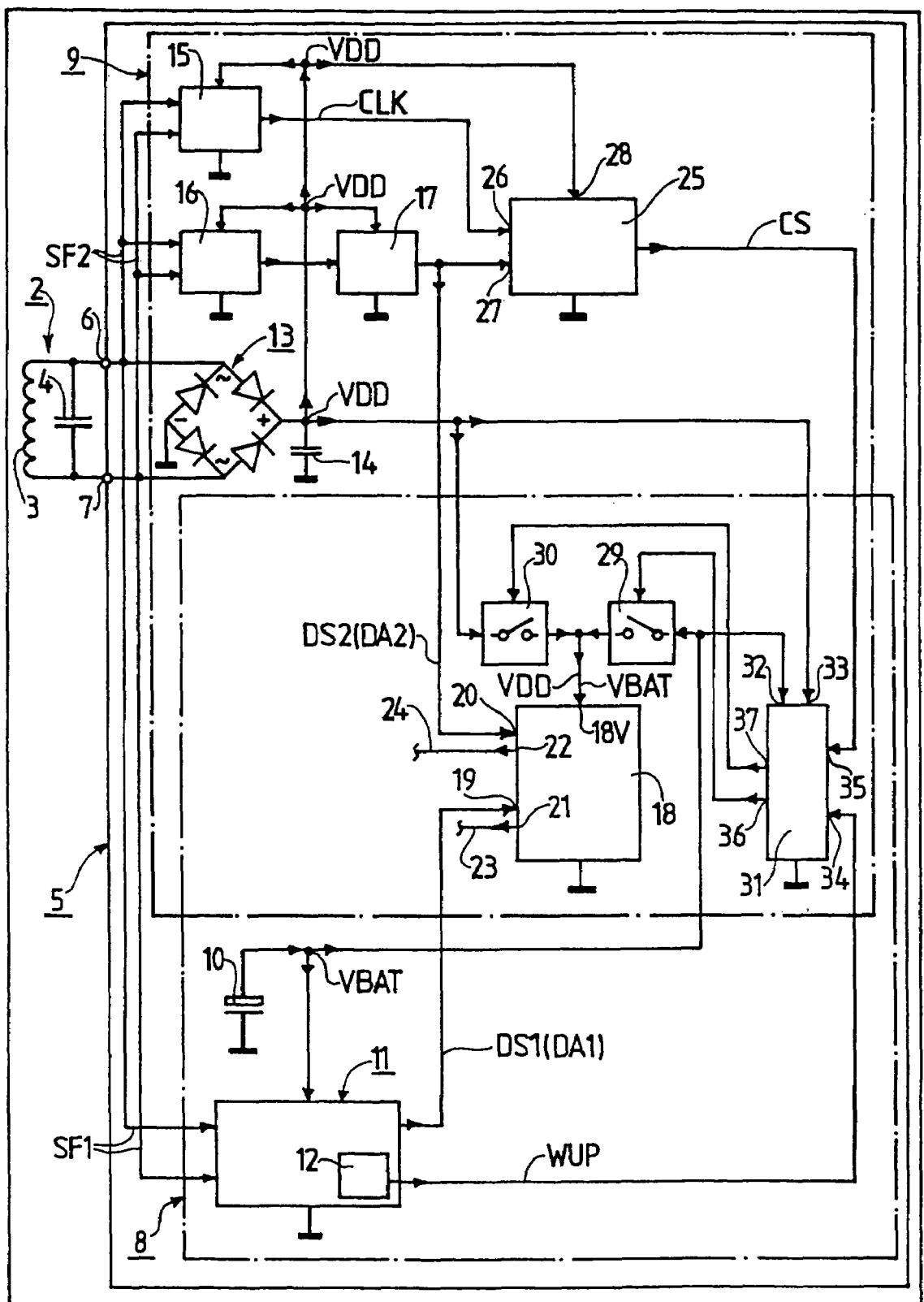
FIG. 1 shows schematically, in the form of a block circuit diagram, a data carrier in accordance with an embodiment of the invention.

FIG. 1 shows a data carrier 1. Data carrier 1 is designed in such a way that a first operating function, which is usually designated an active operating function, and a second operating function, which is usually designated a passive operating function can be realized with data carrier 1. These two operating functions differ from one another in that, in the case of the active operating function, a signal-independent power supply is undertaken from a battery contained in data carrier 1, and, in the case of the passive operating function, a power supply is undertaken from a back-up capacitor provided for the purpose, wherein the back-up capacitor can be charged with the aid of rectifying means, which rectifying means are provided for rectifying a received signal. Further details of this are given below.

In a data carrier 1 of this kind it is of great importance that the battery contained in data carrier 1 is subject to the smallest possible loading, i.e. the lowest possible power consumption is realized in order to achieve the longest possible life for the battery.

Data carrier 1 comprises transmission means 2, which comprise a transmission coil 3 and a capacitor 4 switched in parallel with the transmission coil 3. The transmission coil 3 and the capacitor 4 form a parallel oscillating circuit with a resonant frequency $f_0$ corresponding at least substantially to the frequency of a carrier signal, by means of which carrier signal a signal transmission or data transmission from a communication station not shown in FIG. 1 to data carrier 1 in accordance with FIG. 1 can be undertaken.

Data carrier 1 further comprises an integrated circuit 5. Integrated circuit 5 is equipped with two ports 6 and 7, to which the transmission coil 3 and the capacitor 4 are connected. It should be mentioned at this point that capacitor 4 does not necessarily have to be formed by a capacitor that is external to integrated circuit 5, but may also be formed by an internal capacitor realized in integrated circuit 5.

A first signal processing circuit 8 with a signal-independent power supply is provided in integrated circuit 5. Further provided in integrated circuit 5 is a second signal processing circuit 9 with a signal-dependent power supply.

The first signal processing circuit 8 is provided for realizing the first operating function, and is designed for receiving and processing a signal stream SF1 in accordance with a first transmission protocol. Regarding the first signal stream SF1, you are referred to FIG. 2, in which part of signal stream SF1 is shown schematically. Signal stream SF1 is a Manchester-coded signal in which the already-mentioned carrier signal is coded in accordance with a Manchester code. In a Manchester-coded signal of this kind, it is not possible for a signal state persisting longer than a specified time interval, i.e. longer than 256 microseconds (256 μsec), to occur without a change in the signal, i.e. without a change in the modulated carrier signal, since this carrier signal is subjected to, for example, a 100% amplitude modulation (ASK), and, by virtue of the Manchester coding, a signal change has to occur after not more than 256 microseconds.

The second signal processing device 9 is provided for realization of the above-mentioned passive operating function, and is designed for receiving and processing a signal stream SF2 in accordance with a second transmission protocol. Regarding signal stream SF2, you are referred to FIG. 3 in which part of signal stream SF2 is shown schematically. The significant aspect of signal stream SF2 in the present context lies in the fact that, with a signal stream SF2, a signal characteristic is provided at the start of this signal stream SF2, wherein this signal characteristic is known as a lead signal VLS with a specific minimum duration, wherein the lead signal VLS forming the signal characteristic is formed by the unmodulated carrier signal. In the present case, the lead signal VLS extends beyond a minimum duration, which is greater than two milliseconds (2.0 msec), as specified in FIG. 3. The lead signal VLS is necessary in the present case because, before an actual communication process, it is necessary, with the passive operating function, to build up a supply voltage VDD, which is necessary for undertaking a communication process and is to be fed to the circuit components needed for this purpose. In order to ensure that the supply voltage VDD can be constructed in a simple manner, the lead signal VLS is used for this purpose.

The first signal processing circuit 8 with a signal-independent power supply comprises a first power source 10 for supplying the first signal processing circuit 8 with power, wherein the first power source is formed by a battery 10.

The first signal processing circuit 8 further comprises received-signal processing means 11, which are connected to ports 6 and 7 of integrated circuit 5. The received-signal processing means 11 comprise, in a known manner, means for demodulating a signal received by means of transmission means 2, and means for decoding a demodulated signal and means for emitting a first data signal DS1 in which first data DA1, received with data carrier 1 in the active operating function, is contained. The received-signal processing means 11 further comprise a wakeup-signal generating stage 12, by means of which a wakeup signal WUP can be generated following the establishment of the receipt of a signal stream SF1 in accordance with the first transmission protocol.

The second signal processing circuit 9 comprises rectifier means 13, which are designed in the present case in the style of a bridge rectifier. The rectifier means 13 are connected to the ports 6 and 7 of integrated circuit 5. The rectifier means 13 are provided for generating the above-mentioned supply voltage VDD. Downstream of the rectifier means 13 is connected a back-up capacitor 14, which is provided as a second power source for supplying the second signal processing circuit 9 with power.

The second signal processing circuit 9 further comprises a clock-signal regeneration stage 15, which is also connected to ports 6 and 7 of integrated circuit 5, and which is provided and designed for generating and emitting a regenerated clock signal CLK. The regenerated clock signal CLK is fed to one part of the circuit components of the second signal processing circuit 9, which will not, however, be discussed in further detail here since this represents an operation with which the average person skilled in the art has long been familiar.

The second signal processing circuit 9 further comprises a demodulation stage 16, which is also connected to ports 6 and 7 of integrated circuit 5, and which is provided and designed for demodulating a signal received with transmission means 2. Downstream of demodulation stage 16 is connected a decoding stage 17 which is provided and designed for decoding a demodulated signal. Decoding stage 17 supplies a second data signal DS2 in which second data DA2, received with data carrier 1 in the passive operating function, is contained.

Further provided in integrated circuit 5 are data processing means 18, which, in the present case, are formed by a microcomputer 18. The data processing means 18 may also, however, be formed by a hard-wired logic circuit. Data processing means 18 are equipped with a first input 19 and a second input 20. The first data signal DS1, comprising the first data DA1, can be fed to the first input 19. The second data signal DS2, comprising the second data DA2, can be fed to the second input 20. By means of data processing means 18, processing of the first data DA1 and/or the second data DA2 fed to it is undertaken, this being dependent on whether data carrier 1 is activated for realization of the active operating function or for realization of the passive operating function. Data processing means 18 is related to both the first signal processing circuit 8 and the second signal processing circuit 9.

Data processing means 18 are further equipped with a first output 21 and a second output 22, at which outputs, depending on the operating function activated, data processed by means of data processing means 18 occurs, which data can be fed via junctions 23 and 24 to circuit parts that are not shown, which circuit parts are designed for processing the data and/or data signals fed to them, and with which circuit parts the signals to be transmitted ultimately can be generated, which signals to be transmitted can be transmitted by means of transmission means 2 to a communication station that is not shown.

In the case of integrated circuit 5 and, consequently, of data carrier 1 which comprises integrated circuit 5, detection means 25 are advantageously provided. The detection means 25 are designed for detecting signal characteristic VLS in signal stream SF2 in accordance with the second transmission protocol, so it is designed for detecting lead signal VLS, meaning, in other words, that, in the present case, detection means 25 are designed for detecting the unmodulated carrier signal forming lead signal VLS. Furthermore, in data carrier 1, the circuit-related design of the detection means 25 is selected such that the detection means 25 is designed to initiate the supplying of one part of the second signal processing circuit 9, in this case the data processing means 18, with power from the second power source 14 following a recognition of the occurrence of the signal characteristic VLS, i.e. the lead signal VLS.

Fed to detection means 25 are, at a first input 26, the regenerated clock signal CLK and, at a second input 27, the second data signal DS2 emitted by decoding stage 17. Further fed to detection means 25, at a third input 28, is supply voltage VDD. The regenerated clock signal CLK serves in detection means 25 as a time reference in order that the duration of the lead signal VLS occurring in the second data signal DS2 can be determined in a simple manner. As a result of the feeding of the supply voltage VDD to the detection means 25, it is achieved that it is not just a power supply to the detection means 25 that is achieved, but also that the detection means 25 can fulfill a detection function only when a sufficiently high supply voltage VDD is present, which means, in other words, that a determination of a minimum duration of the lead signal VLS is undertaken only in the case of a lead signal VLS with a sufficiently high amplitude. This minimum duration is shorter than the actual duration of lead signal VLS, which is necessary because it is not until immediately after the START of lead signal VLS at back-up capacitor 14 that a buildup of supply voltage VDD takes place, which buildup of supply voltage VDD requires a specific time span which must be allowed to pass before a detection can be undertaken by means of detection means 25. By means of detection means 25, therefore, detection takes place as to whether an unmodulated carrier signal, received as the lead signal VLS, is present with sufficiently high amplitude and occurs for a minimum time span of, in the present case, more than two milliseconds (2.0 msec). If such a circumstance is established by means of detection means 25, then this must indeed be the lead section VLS of a signal stream SF2 in accordance with the second transmission protocol, so that subsequently the second signal processing circuit 9 must be activated in its entirety, i.e. must be supplied with supply voltage VDD, in order that the signal stream SF2 in accordance with the second transmission protocol can be processed.

To enable the operational situation explained above, the following circuit-related solution is provided for data carrier 1:

Between the first power source 10, i.e. the battery 10, and the data processing means 18, i.e. a supply input 18V of data processing means 18, are provided first controllable switching means 29. Between the second power source 14, i.e. the back-up capacitor 14, and the data processing means 18, i.e. the supply input 18V of the data processing means 18, are provided second controllable switching means 30. Further provided for controlling the first switching means 29 and the second switching means 30 is a control stage 31.

The control stage 31 is equipped with a first input 32 and a second input 33 and a third input 34 and a fourth input 35 and a first output 36 and a second output 37. The supply voltage VBAT emitted by the first power source 10 is permanently present at the first input 32. The supply voltage VDD, generated by means of the rectifier means 13, is present at the second input 33, wherein the feeding of supply voltage VDD to the control stage 31 serves not just for supplying voltage to the control stage 31, but also as a source of information that a supply voltage VDD is in fact present, i.e. that a signal with sufficiently high amplitude is being received by means of transmission means 2, and therefore a lead signal VLS with sufficiently high amplitude must also be present.

The wakeup signal WUP can be fed to the third input 34 of control stage 31, so that the control stage 31 can be notified, by means of wakeup signal WUP, that, by means of received-signal processing means 11, a signal stream SF1 in accordance with the first transmission protocol has been received. If a wakeup signal WUP has been fed to control stage 31, this results in the control stage 31 emitting to the first switching means 29 and to the second switching means 30, via its two outputs 36 and 37, the control signals and/or the control information for the first switching means 29 to be controlled into a conductive switching state, and the second switching means 30 to be controlled into a non-conductive switching state, which results in the data processing means 18 being supplied in this case with supply voltage VBAT and, consequently, with power, from the first power source 10.

The control stage 31 is connected to the detection means 25 via the fourth input 35 of control stage 31. If the detection means 25 establishes the occurrence of signal characteristic VLS, i.e. the occurrence of the lead signal VLS, in a signal stream SF2 in accordance with the second transmission protocol, the detection means 25 emits a control signal CS, which control signal CS is fed to the fourth input 35 of the control stage 31. By means of the control signal CS, the control stage 31 can be controlled by the detection means 25 in such a manner that, following a recognition of the occurrence of the lead signal VLS, the second switching means 30 is controlled into a conductive switching state that connects the data processing means 18 to the second power source 14, wherein the first switching means 29 is then controlled into a non-conductive switching state. It is hereby achieved that, in this operating situation, the data processing means 18 is supplied, via its supply input 18V and via the second switching means 30, with the supply voltage VDD and, consequently, with power, from the back-up capacitor 14.

In the quiescent state of data carrier 1, in which neither the active operating function nor the passive operating function are activated, the control stage 31 ensures that both the first switching means 29 and the second switching means 30 are controlled into their non-conductive switching state, as a result of which it is achieved that data processing means 18 are separated in its entirety from the two power sources 10 and 14, so that any unnecessary power consumption is reliably avoided.

In the case of the above-described data carrier 1 in accordance with FIG. 1, only the voltage supply of the data processing means 18, i.e. of the microcomputer 18, is switched over, by means of the first controllable switching means 29 and the second controllable switching means 30, according to the particular operating function required, i.e. whether the active operating function or the passive operating function is to be undertaken. It should be mentioned that it is also possible not just to switch over the power supply for a microcomputer of a data carrier, but for further circuits parts, in addition to a microcomputer or a hard-wired logic circuit provided in place of such a microcomputer, also to be interfaced, via controllable switching means provided for the purpose, either to a supply voltage VBAT emitted by a battery, or to a supply voltage VDD emitted by a back-up capacitor.

An embodiment of an integrated circuit can also be realized in which the first signal processing circuit with signal-independent power supply for processing a signal stream in accordance with a first transmission protocol, and the second signal processing circuit with signal-dependent power supply for processing a signal stream in accordance with a second transmission protocol are separated from one another in their entirety in terms of circuitry, and wherein, where applicable, the interfacing of the supply voltage VBAT or VDD, as required, to the signal processing circuit in question is undertaken practically for the entire signal processing circuit in each case.

The invention claimed is:

1. A data carrier with an integrated circuit,
wherein a first signal processing circuit with a signal-independent power supply is provided, and
wherein a second signal processing circuit with a signal-dependent power supply is provided, and
wherein the first signal processing circuit is designed to receive and process a signal stream in accordance with a first transmission protocol, and
wherein the second signal processing circuit is designed to receive and process a signal stream in accordance with a second transmission protocol, which signal stream in accordance with the second transmission protocol comprises a signal characteristic, and
wherein a first power source is provided to supply the first signal processing circuit with power, and
wherein a second power source is provided to supply the second signal processing circuit with power, and
wherein detection means are provided, which detection means are designed for detecting the signal characteristic in the signal stream in accordance with the second transmission protocol, and are also designed for initiating the supplying of at least one part of the second signal processing circuit with power from the second power source following a recognition of the occurrence of the signal characteristic.

2. A data carrier as claimed in claim 1,
wherein the second signal processing circuit is designed to receive and process a signal stream in accordance with the second transmission protocol, wherein the signal characteristic of this signal stream is formed by a lead signal with a specific minimum duration, and
wherein the detection means are designed for detecting the lead signal.

3. A data carrier as claimed in claim 2,
wherein the second signal processing circuit is designed to receive and process a signal stream in accordance with the second transmission protocol, wherein the lead signal forming the signal characteristic is formed by an unmodulated carrier signal, and
wherein detection means are designed for detecting the unmodulated carrier signal forming the lead signal.

4. A data carrier as claimed in claim 1,
wherein data processing means are provided, which data processing means are related to both the first signal processing circuit and the second signal processing circuit, and
wherein, between the first power source and the data processing means, are provided first controllable switching means, and
wherein, between the second power source and the data processing means, are provided second controllable switching means, and
wherein a control stage is provided to control the first switching means and the second switching means, and
wherein the control stage is connected to the detection means and can be controlled by detection means in such a manner that, following recognition of the occurrence of the signal characteristic, the second controllable switching means are controlled into a switching state that connects the data processing means to the second power source.

5. An integrated circuit,
wherein a first signal processing circuit with a signal-independent power supply is provided, and
wherein a second signal processing circuit with a signal-dependent power supply is provided, and wherein the first signal processing circuit is designed to receive and process a signal stream in accordance with a first transmission protocol, and wherein the second signal processing circuit is designed to receive and process a signal stream in accordance with a second transmission protocol, which signal stream in accordance with the second transmission protocol comprises a signal characteristic, and wherein a first power source is provided to supply the first signal processing circuit with power, and wherein a second power source is provided to supply the second signal processing circuit with power, and wherein detection means are provided, which detection means are designed for detecting the signal characteristic in the signal stream in accordance with the second transmission protocol, and are also designed for initiating the supplying of at least one part of the second signal processing circuit with power from the second power source following a recognition of the occurrence of the signal characteristic.

6. An integrated circuit as claimed in claim 5, wherein the second signal processing circuit is designed to receive and process a signal stream in accordance with the second transmission protocol, wherein the signal characteristic of this signal stream is formed by a lead signal with a specific minimum duration, and wherein the detection means are designed for detecting the lead signal.

7. An integrated circuit as claimed in claim 6, wherein the second signal processing circuit is designed to receive and process a signal stream in accordance with the second transmission protocol, wherein the lead signal forming the signal characteristic is formed by an unmodulated carrier signal, and wherein the detection means are designed for detecting the unmodulated carrier signal forming the lead signal.

8. An integrated circuit as claimed in claim 5, wherein data processing means are provided, which data processing means are related to both the first signal processing circuit and the second signal processing circuit, and wherein, between the first power source and the data processing means, are provided first controllable switching means, and wherein, between the second power source and the data processing means, are provided second controllable switching means, and wherein a control stage is provided to control the first switching means and the second switching means, and wherein the control stage is connected to the detection means and can be controlled by detection means in such a manner that, following recognition of the occurrence of the signal characteristic, the second controllable switching means are controlled into a switching state that connects the data processing means to the second power source.

* * * * *